(12) United States Patent
Draina et al.

(10) Patent No.: US 9,680,343 B2
(45) Date of Patent: Jun. 13, 2017

(54) METHOD AND KIT FOR UPGRADING A GENERATOR TO ENHANCE OPERATION OF THE GENERATOR

(75) Inventors: Kevin Mitchell Draina, Ballston Lake, NY (US); Benjamin Alber Mancuso, Glenville, NY (US); Donald Alden VanSlyke, Delmar, NY (US)

(73) Assignee: General Electric Company, Schenectady, NY (US)

(*) Notice: Subject to any disclaimer, the term of this patent is extended or adjusted under 35 U.S.C. 154(b) by 865 days.

(21) Appl. No.: 13/103,893

(22) Filed: May 9, 2011

(65) Prior Publication Data
US 2012/0286614 A1 Nov. 15, 2012

(51) Int. Cl.
| H02K 3/24 | (2006.01) |
| H02K 9/00 | (2006.01) |
| H02K 3/51 | (2006.01) |
| H02K 15/00 | (2006.01) |
| H02K 3/02 | (2006.01) |

(52) U.S. Cl.
CPC ............... *H02K 3/24* (2013.01); *H02K 3/51* (2013.01); *H02K 15/0006* (2013.01); *H02K 3/02* (2013.01); *Y02E 20/16* (2013.01); *Y10T 29/49009* (2015.01)

(58) Field of Classification Search
CPC ............. H02K 55/04; H02K 9/00; H02K 3/24
USPC ................................. 310/270, 60 A, 180, 52
IPC ........................................ H02K 55/04,9/00, 3/24
See application file for complete search history.

(56) References Cited

U.S. PATENT DOCUMENTS

| 2,802,124 | A | | 8/1957 | Sjoblom | |
| RE28,478 | E | * | 7/1975 | Bahn et al. | 310/270 |
| 4,091,301 | A | * | 5/1978 | Blank | 310/270 |
| 4,950,934 | A | * | 8/1990 | Holly, III | 310/270 |
| 5,068,564 | A | * | 11/1991 | Frank | 310/270 |
| 5,430,340 | A | | 7/1995 | Shih et al. | |
| 6,020,670 | A | | 2/2000 | Jones et al. | |
| 6,347,968 | B1 | | 2/2002 | Hamilton et al. | |
| 6,600,251 | B2 | | 7/2003 | Laskaris et al. | |
| 6,608,421 | B1 | | 8/2003 | Hamilton et al. | |
| 6,628,020 | B1 | * | 9/2003 | Tong | 310/60 A |
| 6,713,930 | B2 | | 3/2004 | Shah et al. | |
| 6,791,232 | B2 | | 9/2004 | Tong | |
| 6,956,313 | B2 | | 10/2005 | El-Gabry et al. | |
| 7,265,473 | B2 | | 9/2007 | Salem et al. | |

(Continued)

FOREIGN PATENT DOCUMENTS

| CN | 1061118 A | 5/1992 |
| CN | 1372518 A | 10/2002 |

(Continued)

OTHER PUBLICATIONS

Ronald J. Zawoysky et al. "GE Generator Rotor Design, Operational Issuies, and Refurbishment Options", GE Power Systems, GER-4212, Aug. 2001.*

(Continued)

*Primary Examiner* — Michael Andrews
(74) *Attorney, Agent, or Firm* — Fletcher Yoder, P.C.

(57) ABSTRACT

In certain exemplary embodiments, a generator field upgrade kit includes a design modification package configured to be installed in a generator field of a generator as a retrofit to mitigate damage of the generator field due to high cyclic duty of the generator. The design modification package includes a plurality of individual modifications that are selectable based on specific operational and performance parameters of the generator.

17 Claims, 5 Drawing Sheets

(56) References Cited

U.S. PATENT DOCUMENTS

| | | |
|---|---|---|
| 7,311,971 B2 | 12/2007 | Markovitz et al. |
| 7,342,345 B2 | 3/2008 | Salamah et al. |
| 7,480,977 B2 | 1/2009 | Smigelski |
| 7,541,714 B2 | 6/2009 | Parsania et al. |
| 7,791,230 B2 | 9/2010 | Kaminski et al. |
| 2006/0138892 A1* | 6/2006 | Hagino et al. ............... 310/198 |
| 2006/0138896 A1 | 6/2006 | Makansi |
| 2009/0040703 A1* | 2/2009 | Gotham et al. ............. 29/592.1 |
| 2010/0096937 A1* | 4/2010 | Kaminski et al. ............. 310/61 |
| 2010/0237724 A1 | 9/2010 | Neje et al. |
| 2010/0313909 A1 | 12/2010 | Calkins, Jr. et al. |

FOREIGN PATENT DOCUMENTS

| | | |
|---|---|---|
| EP | 484026 A2 | 5/1992 |
| EP | 1638190 A1 | 3/2006 |
| EP | 2180578 A2 | 4/2010 |
| FR | 965377 A | 9/1950 |
| JP | 2001086681 A | 3/2001 |

OTHER PUBLICATIONS

Ronald J. Zawoysky et al. "GE Generator Rotor Design, Operational Issues, and Refurbishment Options," GE Power Systems, GER-4212, Aug. 2001 (27 pages).

James J. Gibney, III. et al. "GE Generators—An Overview," GE Power Generation, GER-3688B, 1994 GE Company (15 pages).

Chinese First Office Action (with English Translation); Application No. CN 201210156655.9; Dated Jul. 21, 2015; 15 pages.

CN Third Office Action and English Translation; Application No. CN 201210156655.9; Dated Jun. 27, 2016; 16 pages.

European Search Report of Application No. 12167191.1, dated Mar. 29, 2017, 11 pgs.

* cited by examiner

METHOD AND KIT FOR UPGRADING A GENERATOR TO ENHANCE OPERATION OF THE GENERATOR

BACKGROUND OF THE INVENTION

The subject matter disclosed herein relates to generators, and more specifically, to systems and methods for enhancing the performance of high cyclic duty generators.

Generators typically employ a combination of a rotor and a stator to convert rotational energy into electrical energy. The trend of generator usage is moving toward increased cycling. With increased cycling, generators frequently start and stop rotation of the rotor, which results in a larger load, increased temperatures, and larger VAR (volt-ampere reactive) swings. Such operation causes increased generator fatigue and may increase wear and tear of the generator. Unfortunately, increased wear and tear may cause generators to experience drastic performance degradation. Therefore, systems and methods for enhancing high-cyclic generator components to overcome such problems may be desirable.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a generator field upgrade kit includes a design modification package configured to be installed in a generator field of a generator as a retrofit to mitigate damage of the generator field due to high cyclic duty of the generator. The design modification package includes a plurality of individual modifications that are selectable based on specific operational and performance parameters of the generator.

In a second embodiment, a method includes retrofitting an existing generator field of a generator with a design modification package to mitigate damage of the generator field due to high cyclic duty of the generator. The design modification package includes a plurality of individual modifications that are selectable based on specific operational and performance parameters of the generator.

In a third embodiment, a generator field upgrade kit includes a design modification package configured to be installed in a generator field of a generator as a retrofit to mitigate damage of the generator field due to high cyclic duty of the generator. The design modification package includes field windings of the generator field that are made of copper coils having high silver content, two or more mechanically hardened turns of field windings of the generator field, and an enhanced cooling mechanism as a replacement or supplement to an original cooling mechanism of the generator field.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As described above, generators may be operated with increased cycling. With increased cycling, the frequency of starting and stopping rotation of the rotor is increased, which may result in increased loads, increased temperatures, and larger VAR swings. Such operation may cause increased generator fatigue and may increase wear and tear of the generator. Specifically, as the rotor begins rotating and ramps up to an operating speed, generator components may be subjected to a full load cycle due to centrifugal loading. For example, in certain instances, copper coils, connectors, and terminals of the generator may be exposed to an increased amount of fatigue with each operational cycle. Further, retaining rings may increase in size as coil loading occurs, thereby resulting in circumferential loading on endwindings. In addition, when excited with current, the temperature of the endwindings may increase. As generator components vary in temperature, thermal growth may occur, which may cause additional loading on the copper coils, connectors, insulation, and blocking. Furthermore, when thermal expansion is combined with generator cycling, certain generator components may migrate toward each other, thus resulting in distorted generator components and/or insulation.

In addition, in certain situations, it may be advantageous to operate the generator for short periods of time and with varying loads, such as operating the generator with large VAR swings. In such instances, the generator may be enhanced to limit fatigue due to operating conditions. For example, as described in greater detail below, a generator field upgrade kit may include enhancements for the generator to decrease migration, circumferential loading, thermal loading, and/or centrifugal loading. As such, the generator may experience a decrease in downtime as certain generator components are enhanced and/or replaced with the enhanced components described herein. Moreover, various generator components may be enhanced as a selected group to improve the overall generator performance.

The disclosed embodiments include systems and methods for generator enhancement, such as with a generator field upgrade kit. In certain exemplary embodiments, a generator is enhanced using the generator field upgrade kit, which may include a design modification package having a plurality of individual modifications that may be selected based on the operational and performance parameters of the generator. For example, in one exemplary embodiment, the generator may be enhanced using the generator field upgrade kit including the design modification package having field windings of the generator field that are made of copper coils having high silver content, two or more mechanically hardened turns of field windings of the generator field, and an enhanced cooling mechanism as a replacement or supplement to an original cooling mechanism of the generator field. In other embodiments, as described in greater detail below, additional individual modifications (and combinations of modifications) may be used part of the design modification package. By using the field upgrade kit to enhance the generator, the wear and tear on the generator caused by increased cycling may be reduced, thereby reducing the adverse effects of generator cycling described above. For example, typical winding coils of the generator may last between approximately 3,000 to 6,000, 4,000 to 8,000, or 5,000 to 10,000 cycles of either load cycling or start/stop cycling before developing adversely affected coils. The field upgrade kits described herein may increase the number of cycles that winding coils withstand by approximately 2 to 5, 3 to 5, or 4 to 10 times. For example, hardened turns and/or bonded turns may increase the number of cycles that winding coils withstand by approximately 2 to 3 times.

Figure 1:
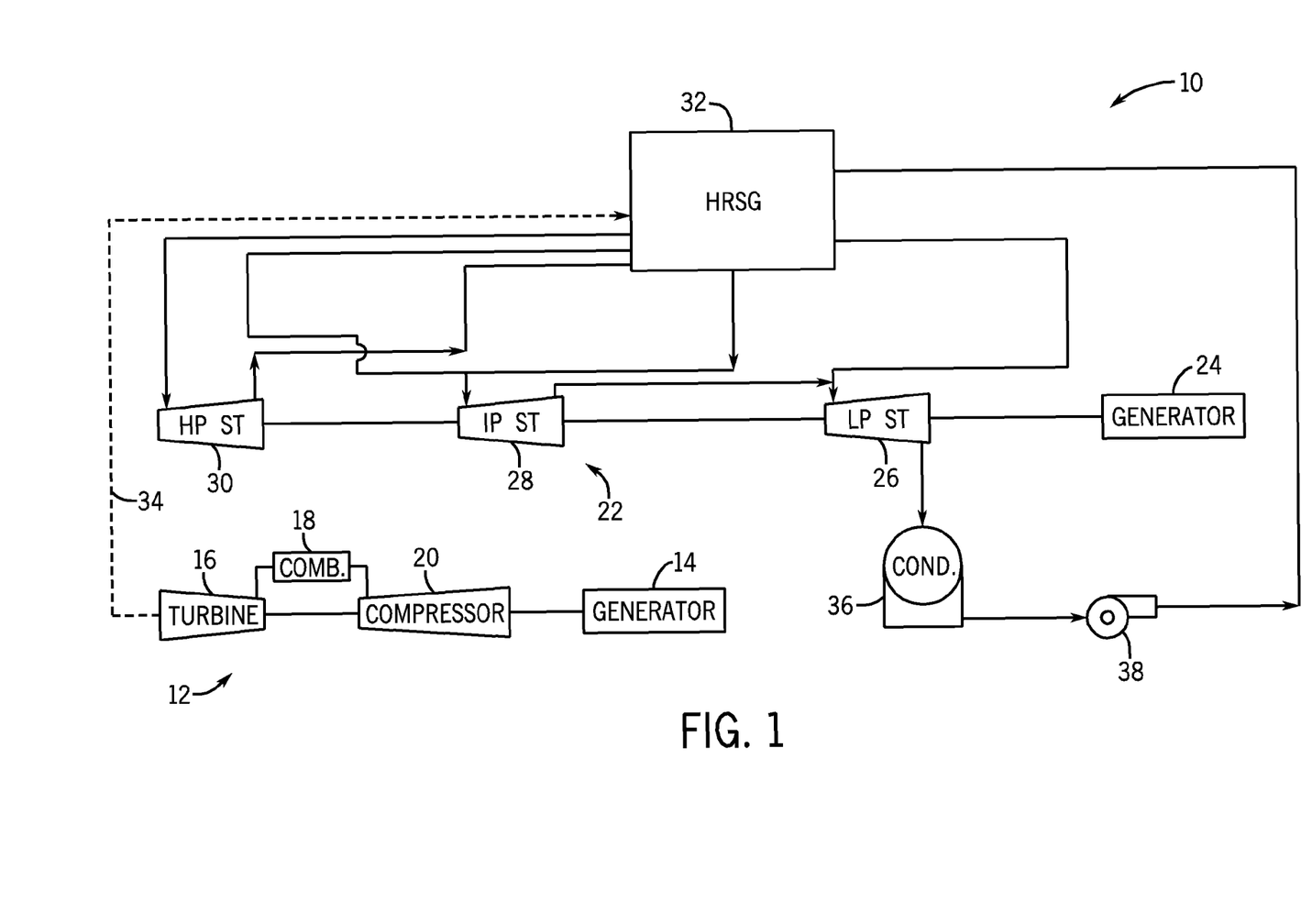
FIG. 1 is a schematic flow diagram of an embodiment of a combined cycle power generation system.

FIG. 1 is a schematic flow diagram of an embodiment of a combined cycle power generation system 10 having a gas turbine, a steam turbine, and a heat recovery steam generator (HRSG). The system 10 is described below for the purpose of providing context for embodiments of generator enhancements. It should be appreciated that the generator embodiments described below may be incorporated into other power generation systems. The system 10 includes a gas turbine 12 for driving a first generator 14 to produce electrical power. The gas turbine 12 includes a turbine 16, a combustor or combustion chamber 18, and a compressor 20. The system 10 also includes a steam turbine 22 for driving a second generator 24. In addition, although the gas turbine 12 and steam turbine 22 drive separate generators 14 and 24 as shown in the illustrated embodiment, the gas turbine 12 and steam turbine 22 may also be utilized in tandem to drive a single load via a single shaft. In the illustrated embodiment, the steam turbine 22 includes one low-pressure section 26 (LP ST), one intermediate-pressure section 28 (IP ST), and one high-pressure section 30 (HP ST). However, the specific configuration of the steam turbine 22, as well as the gas turbine 12, may be implementation-specific and may include any combination of sections.

The system 10 also includes a multi-stage HRSG 32. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gas 34 from the gas turbine 12 may be transported into the HRSG 32 and used to heat steam used to power the steam turbine 22. Exhaust from the low-pressure section 26 of the steam turbine 22 may be directed into a condenser 36. Condensate from the condenser 36 may, in turn, be directed into a low-pressure section of the HRSG 32 with the aid of a condensate pump 38.

Figure 2:
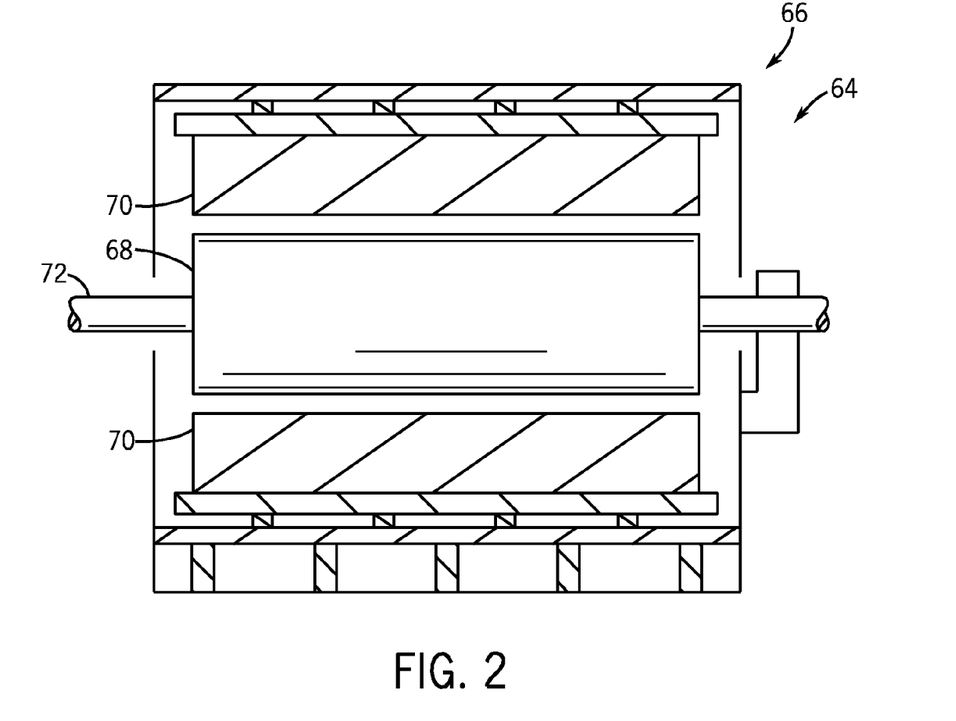
FIG. 2 is a cross-sectional side view of an embodiment of a generator, as shown in FIG. 1.

FIG. 2 is a cross-sectional side view of an embodiment of a generator 64 that may serve as the generator 14 and/or generator 24 in the combined cycle power generation system 10 illustrated in FIG. 1, or in various other power generation systems. The generator 64 includes an annular frame 66, a rotor 68, a stator 70, and a shaft 72. The shaft 72 may be driven to rotate by a gas turbine, a steam turbine, a wind turbine, a hydro turbine, an internal combustion engine, or any other suitable device configured to provide a rotational output. The shaft 72 is coupled to a substantially cylindrical rotor 68 that may include a wire winding about a magnetic core. The rotor 68 is disposed within the stator 70, which is configured to provide a stationary magnetic field. As may be appreciated, rotation of the rotor 68 within the stator 70 may generate electrical current within the wire winding, thereby producing an electrical output from the generator 64. As described above, high cyclic duty of the generator 64 may lead to performance degradations of the generator 64 over time. The embodiments described below include methods for enhancing performance of the generator 64 through the use of a design modification package that may contain several modifications to the generator 64.

Figure 3:
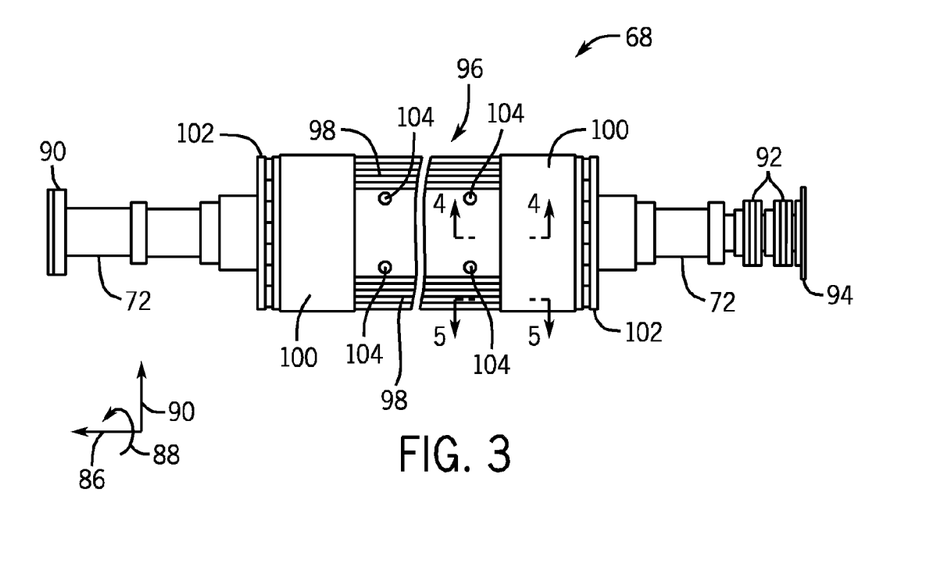
FIG. 3 is a side view of an embodiment of a generator rotor of the generator of FIG. 2.

FIG. 3 is a side view of an embodiment of the generator rotor 68 of the generator 64 of FIG. 2. As illustrated, the rotor 68 includes the shaft 72 with a coupling 90, such as a mechanical mode or power turbine coupling, on one end. The shaft extends in an axial direction 86, and rotates the rotor 68 in a circumferential direction 88. Further, the rotor 68 extends out from the shaft 72 in a radial direction 90. On the other end of the shaft 72, there are collector rings 92 thereon that provide an electrical junction for the rotor field windings. In certain embodiments, a collector fan 94 may be located adjacent to the collector rings 92. The rotor 68 has a large diameter body 96 that holds coil windings 98. The coil windings 98 are disposed in axially oriented 86 slots that extend radially 90 outward from the middle of the rotor 68 to the axial 86 ends of the rotor body 96. Annular retaining rings 100 cap both ends of the rotor body 96. Adjacent to the retaining rings 100 are fans 102 that cool the retaining rings 100 and other rotor components. Balance plugs 104 are disposed in the rotor body 96 to enable adjustments to the balancing of the rotor 68.

Figure 4:
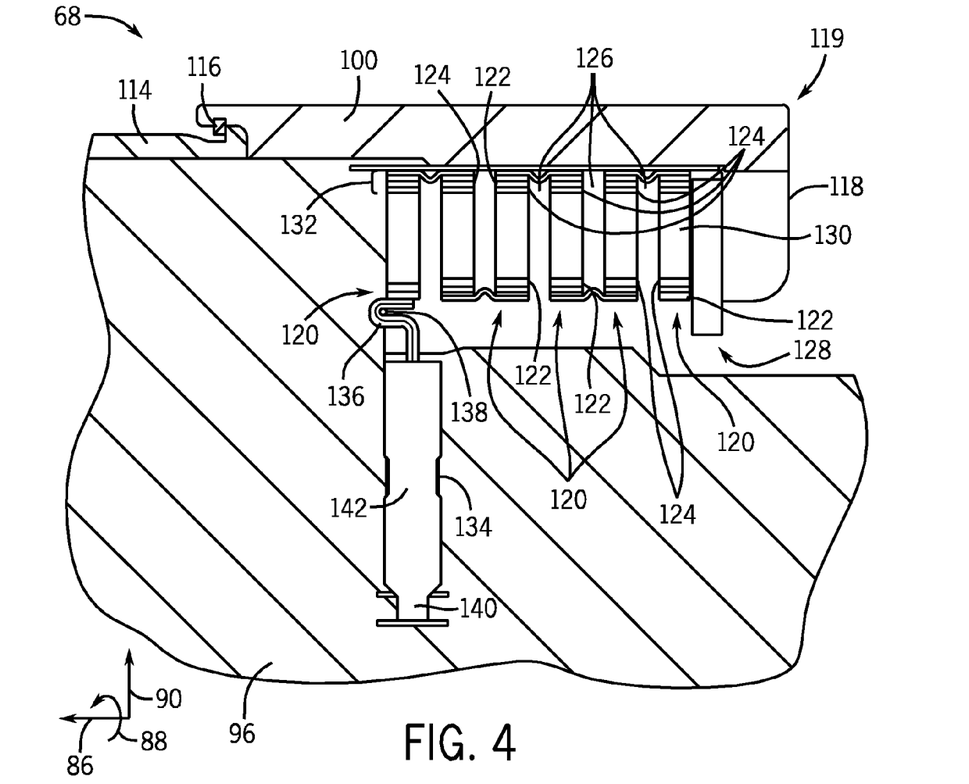
FIG. 4 is a partial cross-sectional side view of an embodiment of the rotor shown in FIG. 3, illustrating a coupling between the retaining ring and the rotor body.

FIG. 4 is a partial cross-sectional side view of an embodiment of the rotor 68 shown in FIG. 3 taken within line 4-4, illustrating a coupling between the retaining ring 100 and wedges 114 of the rotor 68. An annular locking ring 116 secures the retaining ring 100 to the wedges 114. A centering ring 118 is attached to a distal end 119 of the retaining ring 100. It should be noted that, in other embodiments, the retaining ring 100 and the centering ring 118 may be mounted with respect to each other in other ways. The retaining ring 100 is disposed around end turns of the rotor 68 to hold endwindings 120 in place against centrifugal forces. The endwindings 120 have winding turns 122 separated by layers of electrical insulation 124. Gaps 126 separate the endwindings 120 from each other.

In certain embodiments, the generator 64 may be enhanced by inserting a spring loaded block 128 between the centering ring 118 and an end coil 130. For example, the field upgrade kit may include a design modification package with a spring loaded block 128 for installation between the centering ring 118 and the end coil 130. The spring loaded block 128 may comprise two block halves mated together with a spring disposed between the two block halves. One of the block halves may have a recess, while the other block half may have a protrusion that mates with the recess. The recess and the protrusion may be any shape, such as generally circular, square, pentagonal, or rectangular. The spring may be placed in the block half with the recess before the block half with the protrusion is mated. The spring may be any type of spring, such as a flat or coil spring. Therefore, the two block halves may be compressed together, and when decompressed, the block halves may return to their starting position.

As the coils grow and shrink back to original states due to temperature cycling, axial 86 gaps may develop between the coils, leading to coil migration. The spring loaded block 128 is positioned to absorb thermal growth from the end coil 130 caused by the axial thermal loads on the coils, thus compressing the spring loaded block 128. The spring loaded block 128 transmits the axial 86 thermal loads to the centering ring 118. When the end coil 130 cools, the spring loaded block 128 is decompressed and springs back into place, thus consistently applying a force to the end coil 130 whether the end coil 130 is at high temperatures or at low temperatures. Therefore, the spring loaded block 128 may reduce thermal expansion forces applied by the coil 130 to the centering ring 118.

During operation of the generator, the winding turns 122 of the endwindings 120 adjacent to the retaining rings 100, such as the two to three winding turns 122 adjacent to the retaining rings 100, may see the greatest mechanical loads. Mechanical loading that occurs with cyclical starting and stopping, in combination with thermal loads caused by thermal expansion, may cause the winding turns 122 of the endwindings 120 to migrate within their coil stack. Therefore, the winding turns 122 adjacent to the retaining rings 100 may be mechanically bonded with a bonding material 132 to enhance the generator operation. For example, 2, 3, 4, 5, 6, or all of the turns in one coil adjacent to the retaining rings 100 may be bonded together. The bonding material 132 may be a resin, epoxy, tape, or other material that mechanically bonds the turns together. As such, in certain embodiments, the field upgrade kit may include a design modification package with at least 2, 3, 4, 5, 6, or all of the winding turns 122 in one coil of an endwinding 120 that are mechanically bonded to each other. Thus, the potential of winding turns 122 being distorted and migrating is reduced.

As illustrated in FIG. 4, a main terminal 134 is connected to one of the endwindings 120 via a leaf connector 136 (i.e., leaf copper, for electrical connection with the endwinding 120), which may be configured in a gooseneck shape. The leaf connector 136 may become fatigued when the rotor 68 starts and stops a cycle. As such, the leaf connector 136 may include a pin 138 to provide support and inhibit fatigue caused by the rotor 68 starting and stopping. The main terminal 134 includes a lower portion 140 and a middle portion 142 that may be secured to the rotor body 96 to provide additional support to the main terminal 134.

Figure 5:
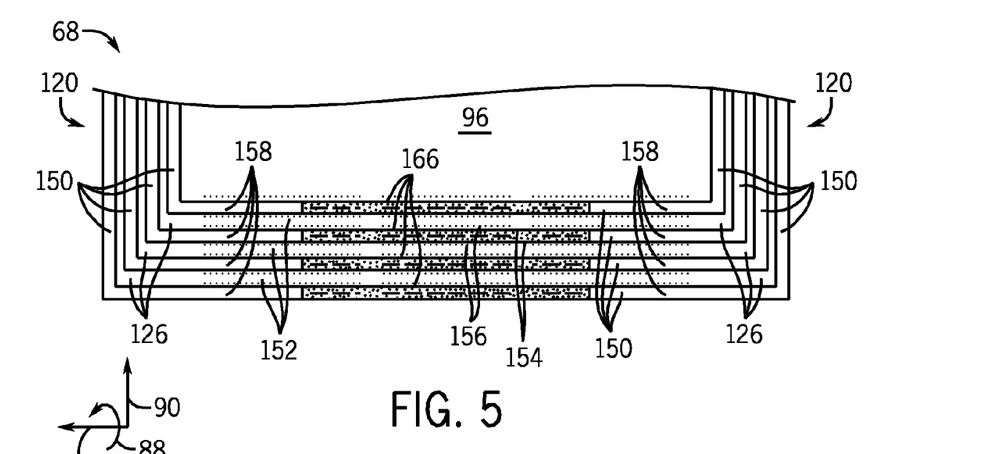
FIG. 5 is a partial cross-sectional side view of an embodiment of the rotor shown in FIG. 3, illustrating coils of the rotor.

FIG. 5 is a partial cross-sectional side view of an embodiment of the rotor 68 shown in FIG. 3 taken within line 5-5, illustrating coils 150 of the rotor 68. The coils 150 extend along the rotor body 96 and may be made of copper or another appropriate conductor. The endwindings 120 of the coils 150 are located on either side of the rotor body 96. Gaps 126 are located between the endwindings 120. In certain embodiments, spacers may be placed at various locations within the gaps 126 to separate the coils 150. Rotor teeth 152 may be located between the coils 150. Further, the coils 150 are disposed in slots 154 that extend axially 86 along the rotor body 96. Slot armors 156 are located between the coils 150 and the slots 154 to serve as insulation between the rotor teeth 152 and the coils 150. The slot armors 156 may be either rigid or non-rigid. In certain embodiments, rigid slot armors 156 may include a fiber matrix in a cured resin binder, while non-rigid slot armors 156 may include a non-woven paper-like polyamide material.

The coils 150, such as copper coils, may exert a compression load on the slot armors 156. Such a compression load on the slot armors 156 may increase toward the endwindings 120. Furthermore, the compression loading may increase with frequent starting and stopping of the rotor 68 or with thermal cycling. To provide compression relief, in certain embodiments, the coils 150 and/or the slots 154 may be machined at locations 158. For example, the coils 150 and/or the slots 154 may be machined using tools, such as portable metal machining tools to drill, saw, cut, sand, grind, and/or polish. Thus, in certain embodiments, the width of the coils 150 may be decreased and/or the width of the slots 154 may be increased. Therefore, the compression loads may be reduced and spread more evenly along the rotor body 96, thereby reducing damage to the slot armors 156. As such, in certain embodiments, the field upgrade kit may include a design modification package including a machine relief in the coils 150, the slots 154, or both.

Figure 6:
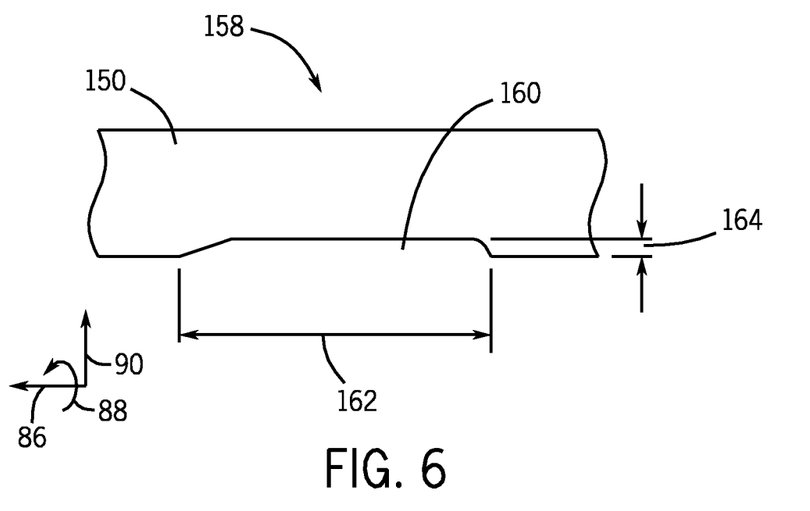
FIG. 6 is a detailed view of an embodiment of the machined locations shown in FIG. 5, illustrating a machined coil.

Specifically, FIG. 6 depicts a detailed view of an embodiment of the machined locations 158 shown in FIG. 5, illustrating a machined coil 150. The coil 150 may be machined to remove a portion of the coil 150 to create a relief area 160. Such a relief area 160 may provide compression relief when compression loading occurs. The relief area 160 may include a length 162 and a depth 164 sufficient to enable the compression relief. For example, the depth 164 may be approximately 0.5 to 1.3, 0.8 to 1.7, or 1.1 to 2.0 millimeters. Specifically, in certain embodiments, the depth 164 may be approximately 6.4 millimeters. Furthermore, the length 162 and the depth 164 may be determined by the amount of compression loading that occurs at location 158. As the rotor 68 turns in the circumferential direction 88, the coil 150 may have compress against the slot armors, such as in the radial direction 90. With the relief area 160 at locations 158, the compression loading may be decreased due to the depth 164.

Returning now to FIG. 5, the generator thermal loads may increase in proportion to the temperature rise of the field windings. Further, thermal load cycling can be a cause of cyclic duty degradation. Therefore, enhancing the cooling of the coils 150 may decrease operating temperatures, thus decreasing thermal loads and decreasing degradation. As such, in certain embodiments, enhanced cooling methods may be implemented, such as increasing the coil ventilation with enhanced cooling mechanisms 166 to replace original cooling mechanisms. Such enhanced cooling mechanisms 166 may include oval rotor ducts, which may replace the original rotor ducts in the slots 154. Other enhanced cooling methods may include adding openings or grooves to the coils 150 when openings or grooves are not present, or modifying the openings or grooves if openings or grooves are present.

Figure 7:
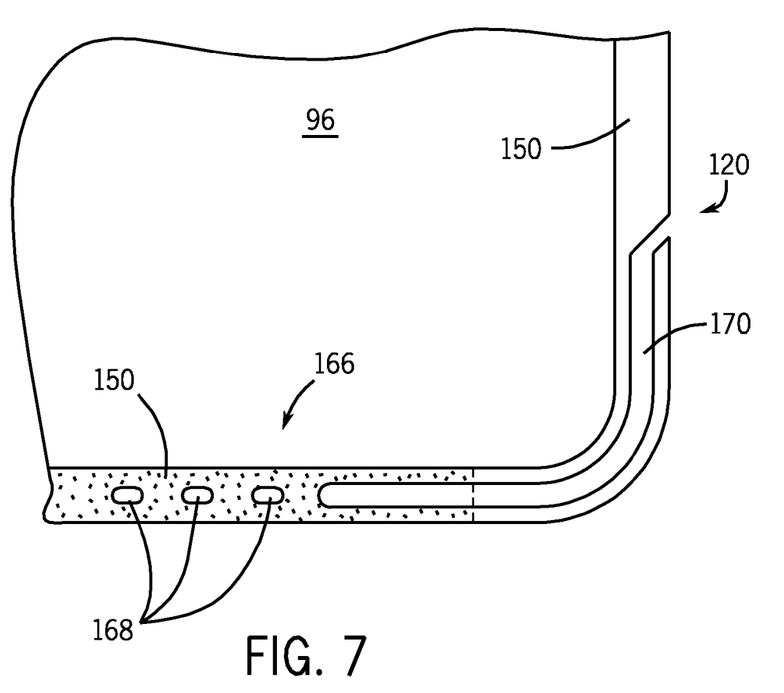
FIG. 7 is a detailed view of an embodiment of the coil shown in FIG. 5, illustrating enhanced cooling mechanisms.

Specifically, FIG. 7 is a detailed view of an embodiment of the coil 150 shown in FIG. 5, illustrating enhanced cooling mechanisms 166. The coil 150 may include openings 168 positioned along the length of the coil 150. The openings 168 may increase the efficiency of removing heat from the rotor body 96 by enabling heated air to escape through the openings 168. The openings 168 may be any shape, such as circular, oval, square, or triangular. In addition, the openings 168 may decrease the quantity of material of the coil 150. For example, the openings 168 may decrease the amount of coil 150 material by approximately 5 to 20, 10 to 30, or 15 to 35 percent. Specifically, the openings 168 may decrease the amount of coil 150 material by approximately 13 percent.

Further, the coil 150 may include grooves 170, such as the illustrated groove 170 extending along the coil 150 and into the endwindings 120. For example, the grooves 170 may be added to the coils 150 by machining a middle portion of the coils 150, thereby forming the grooves 170 in the coil. The grooves 170 also may increase the efficiency of removing heat from the rotor body 96 by enabling heated air to escape through the grooves 170. The grooves 170 may also decrease the quantity of material of the coil 150. For example, the grooves 170 may decrease the amount of coil 150 material by approximately 15 to 30, 20 to 45, or 10 to 25 percent. Specifically, in certain embodiments, the grooves 170 may decrease the amount of coil 150 material by approximately 33 percent. As such, in certain embodiments, the field upgrade kit may include a design modification package including an enhanced cooling mechanism 166 as a replacement or supplement to an original cooling mechanism.

Figure 8:
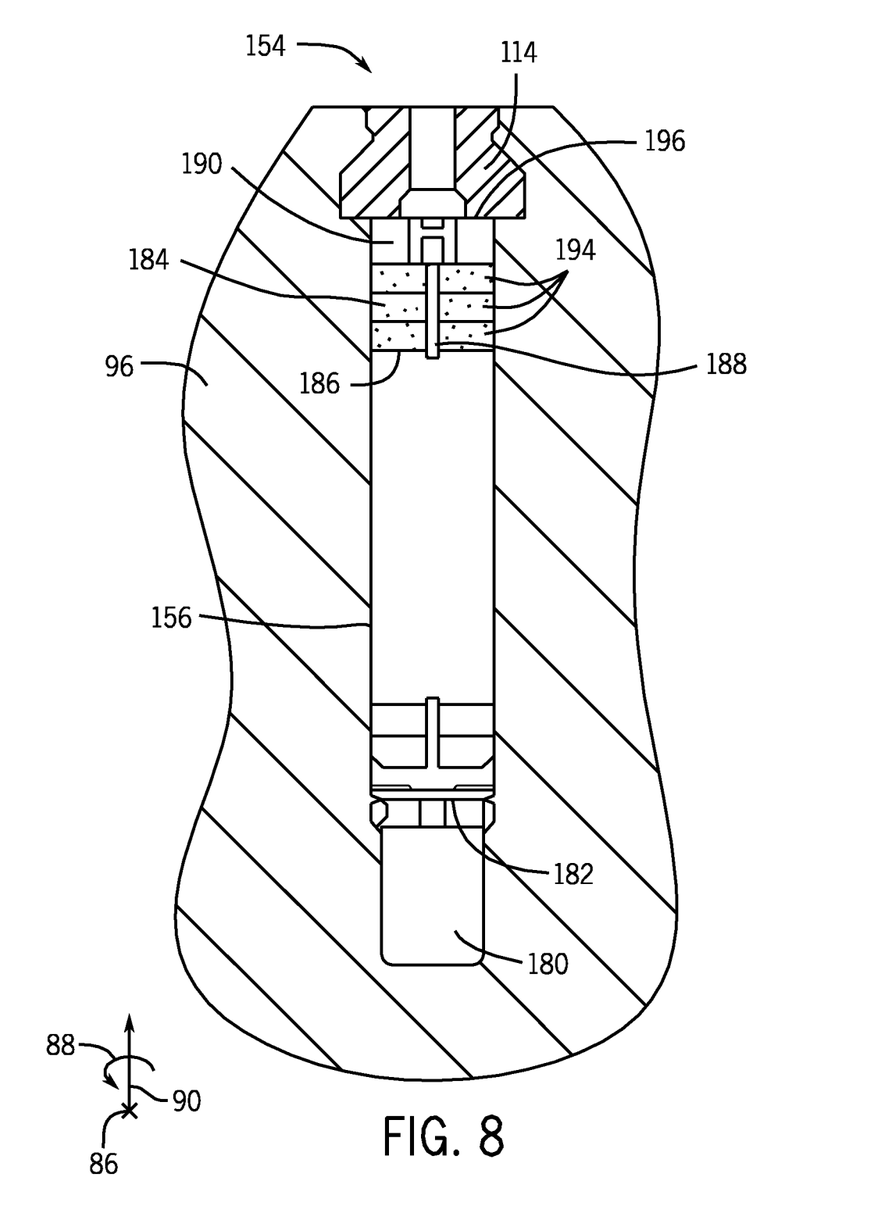
FIG. 8 is a cross-sectional side view of an embodiment of a slot of the rotor shown in FIG. 5.

FIG. 8 is a cross-sectional side view of an embodiment of a slot 154 of the rotor 68 shown in FIG. 5. The slot 154 is machined from the rotor body 96 and contains a sub-slot 180, which may provide a ventilation path in the rotor body 96. A sub-slot cover assembly 182 may provide support for the slot components. The slot armor 156 serves as the insulation between copper coils 184 and the rotor body 96. The copper coils 184 carry a current to provide magnetic flux. Insulation 186 provides electrical insulation between the copper coils 184. A rotor duct 188 provides a path for ventilation gases to flow from the sub-slot 180 to the copper coils 184 and out of the rotor body 96. A creepage block 190 provides mechanical support and electrical separation between the copper coils 184 and the wedges 114. The creepage block 190 may be made of a pressed fiberglass cloth laminate with an epoxy resin. The coefficient of friction of such a creepage block 190 may be approximately 0.4 to 0.6, 0.5 to 0.9, or 0.7 to 1.0, for example.

The copper coils 184 are made of a substantially copper material. Conventional copper coils 184 may contain low amounts of silver, such as approximately 0 to 15 troy ounces of silver per ton. For example, in certain embodiments, the copper coils 184 may contain approximately 10 troy ounces of silver per ton. However, the copper coils 184 may receive loading such as low cycle fatigue from frequent rotor starting and stopping, and/or the copper coils 184 may receive loading from thermal cycling. As such, in certain embodiments, the copper coils 184 may be replaced with replacement copper coils 184 having a high silver content copper, such that it may be more resistant to fatigue degradation. For example, in certain embodiments, the high silver content copper coils 184 may include approximately 16, 17, 18, 19, 20, 21, 22, 23, 24, 25, or more troy ounces of silver per ton. In addition, in other embodiments, the copper coils 184 may be replaced with a high silver content copper, such as a copper with approximately 25 troy ounces of silver per ton. As such, in certain embodiments, the field upgrade kit may include a design modification package including replacement copper coils having high silver content. Copper coils with high silver content may increase resistance to stress relaxation, thereby reducing coil distortion.

Mechanical loads on the coils 184 are often the greatest on two or three top turns 194. Again, this mechanical loading may be caused by frequent starting and stopping of the rotor 68 and/or by thermal loads due to thermal expansion. Such loading may cause the copper coils 184 to become distorted, such as in the endwinding region. Furthermore, the copper coils 184 may migrate within the slot 154. For example, the copper coils 184 may migrate toward the centering ring 118. Therefore, in certain embodiments, the top three turns 194 may be mechanically hardened, thus reducing the risk of distortion or migration. In other embodiments, the top 2, 4, 5, or 6 coils may be mechanically hardened. As such, in certain embodiments, the field upgrade kit may include a design modification package including mechanically hardened coils, such as two or more coils, which may be used to replace the existing copper coils 184. For example, in certain embodiments, the copper coils 184 may be mechanically hardened by cold working copper to a desired hardness without annealing the copper. As such, the copper coils 184 may have an increased hardness of approximately 20 to 60, 30 to 80, or 50 to 120 percent. Specifically, annealed copper (not mechanically hardened) may have a Rockwell C hardness of approximately 30 to 45, while mechanically hardened copper may have a Rockwell C hardness of approximately 60, 61, 62, 63, 64, 65, 66, 67, 68, or greater.

The copper coils 184 may expand as temperature increases. Therefore, a temperature increase may cause the copper coils 184 to expand toward the centering ring 118. Thus, a smooth surface on the creepage block 190 may reduce the frictional forces between coil 184 and creepage block 190 by enabling the copper coils 184 to slide when contacting the creepage block 190. Therefore, in certain embodiments, a smooth surface may be created by coating the creepage block 190 with a material, such as Teflon, to reduce friction. For example, the friction may be reduced by the Teflon to a coefficient of friction of approximately 0.03 to 0.08, 0.04 to 0.09, or 0.05 to 0.1. Specifically, in certain embodiments, the coefficient of friction may be approximately 0.04. As such, in certain embodiments, the field upgrade kit may include a design modification package including a Teflon coated creepage block to replace the creepage block 190 without Teflon coating. Furthermore, materials other than Teflon may be used, such that the materials decrease the coefficient of friction of the creepage block 190. The slot 154 may include an amortisseur 196 below the coil wedge 114.

As described above, the present embodiments include a generator field upgrade kit including a design modification package with a plurality of individual modifications. For example, in certain embodiments, a modification may include field windings of the generator field that are made of copper coils having high silver content, as described above with respect to FIG. 8. In addition, in certain embodiments, a modification may include two or more mechanically hardened turns of field windings of the generator field, as described above with respect to FIG. 8. In addition, in certain embodiments, a modification may include an enhanced cooling mechanism as a replacement or supplement to an original cooling mechanism of the generator field, as described above with respect to FIG. 5. Further, in certain embodiments, a modification may include at least two turns of an endwinding of field windings of the generator field that are mechanically bonded to each other, as described above with respect to FIG. 4. In addition, in certain embodiments, a modification may include a spring-loaded block configured to be inserted between an end coil and a centering ring of the generator field, as described above with respect to FIG. 4. Further, in certain embodiments, a modification may include a Teflon coated creepage block of the generator field, as described above with respect to FIG. 8. In addition, in certain embodiments, a modification may include a machine relief in either a coil or a rotor slot of the generator field, as described above with respect to FIG. 5.

The generator field upgrade kit may include one or more individual design modification packages as described above. For example, in certain embodiments, 1, 2, 3, 4, 5, or even more individual design modification packages may be combined into a single field upgrade kit. For example, in certain embodiments, the generator field upgrade kit may include 1, 2, 3, 4, 5, 6, or all 7 of the following: (1) field windings of the generator field that are made of copper coils 184 having high silver content, (2) two or more mechanically hardened turns 194 of field windings of the generator field, (3) an enhanced cooling mechanism 166 as a replacement or supplement to an original cooling mechanism of the generator field, (4) at least two turns of an endwinding 120 of field windings of the generator field that are mechanically bonded to each other, (5) a spring-loaded block 128 configured to be inserted between an end coil 130 and a centering ring 118 of the generator field, (6) a Teflon coated creepage block 190 of the generator field, and (7) a machine relief in either a coil 150 or a rotor slot 154 of the generator field.

In addition, in certain embodiments, particular combinations or design modification packages may be particularly beneficial when combined together. For example, in certain embodiments, a field upgrade kit may include a combination of modifications including: (1) field windings of the generator field that are made of copper coils 184 having high silver content, (2) two or more mechanically hardened turns 194 of field windings of the generator field, and (3) an enhanced cooling mechanism 166 as a replacement or supplement to an original cooling mechanism of the generator field.

As another example, in certain embodiments, a field upgrade kit may include a combination of modifications including: (1) at least two turns of an endwinding 120 of field windings of the generator field that are mechanically bonded to each other, and (2) a spring-loaded block 128 configured to be inserted between an end coil 130 and a centering ring 118 of the generator field. As a further example, in certain embodiments, a field upgrade kit may include a combination of modifications including: (1) an enhanced cooling mechanism 166 as a replacement or supplement to an original cooling mechanism of the generator field, and (2) a machine relief in either a coil 150 or a rotor slot 154 of the generator field. Specific combinations of design modifications may be selected based on specific operation and performance parameters of the specific generator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A generator field kit, comprising:
a design modification package configured to be installed in a generator field of a generator as a retrofit, wherein the design modification package comprises a plurality of individual modification features that are selectable based on specific operational and performance parameters of the generator, the plurality of individual modification features comprises an enhanced cooling mechanism as a replacement or supplement to an original cooling mechanism of the generator field, the enhanced cooling mechanism comprises a coil having a groove formed through the coil, and the groove extends axially from a middle portion of the coil to an endwinding portion of the coil to facilitate heated air escaping through the groove, and wherein the plurality of individual modification features comprises two or more mechanically hardened turns of field windings of the generator field, and the two or more mechanically hardened turns are hardened without annealing.

2. The generator field upgrade kit of claim 1, wherein the plurality of individual modification features comprises field windings of the generator field that are made of copper coils having high silver content.

3. The generator field upgrade kit of claim 1, wherein the plurality of individual modification features comprises at least two turns of an endwinding of field windings of the generator field that are mechanically bonded to each other.

4. The generator field upgrade kit of claim 1, wherein the plurality of individual modification features comprises a spring-loaded block configured to be inserted between an end coil and a centering ring of the generator field.

5. The generator field upgrade kit of claim 1, wherein the plurality of individual modification features comprises a polytetrafluoroethylene coated creepage block of the generator field.

6. The generator field upgrade kit of claim 1, wherein the plurality of individual modification features comprises a machine relief in either a coil or a rotor slot of the generator field.

7. The generator field upgrade kit of claim 1, wherein the plurality of individual modification features comprises at least two turns of an endwinding of field windings of the generator field that are mechanically bonded to each other, and a spring-loaded block configured to be inserted between an end coil and a centering ring of the generator field.

8. The generator field upgrade kit of claim 1, wherein the two or more mechanically hardened turns have a Rockwell C hardness greater than or equal to 60.

9. The generator field upgrade kit of claim 1, wherein the two or more mechanically hardened turns comprise cold worked copper.

10. The generator field upgrade kit of claim 1, wherein the plurality of individual modification features comprises:
field windings of the generator field that are made of copper coils having high silver content;

at least two turns of an endwinding of field windings of the generator field that are mechanically bonded to each other;

a spring-loaded block configured to be inserted between an end coil and a centering ring of the generator field;

a polytetrafluoroethylene coated creepage block of the generator field; and a machine relief in either a coil or a rotor slot of the generator field.

11. A method, comprising:

providing a design modification package for retrofitting an existing generator field of a generator, wherein the design modification package comprises a plurality of individual modification features that are selectable based on specific operational and performance parameters of the generator, the plurality of individual modification features comprises an enhanced cooling mechanism as a replacement or supplement to an original cooling mechanism of the generator field, the enhanced cooling mechanism comprises a coil having a groove formed through the coil, and the groove extends axially from a middle portion of the coil to an endwinding portion of the coil to facilitate heated air escaping through the groove, and wherein the plurality of individual modification features comprises two or more mechanically hardened turns of field windings of the generator field, and the two or more mechanically hardened turns are hardened without annealing; and selecting one or more of the individual modification features of the design modification package based on the specific operational and performance parameters of the generator.

12. The method of claim 11, comprising replacing field windings of the generator field with copper coils having high silver content as an individual modification feature.

13. The method of claim 11, wherein the two or more mechanically hardened have a Rockwell C hardness greater than or equal to 60.

14. The method of claim 11, wherein comprising mechanically bonding at least two turns of an endwinding of generator field windings of the generator field to each other as an individual modification feature.

15. The method of claim 11, wherein comprising installing a spring-loaded block between an end coil and a centering ring of the generator field as an individual modification feature.

16. The method of claim 11, wherein comprising coating a creepage block of the generator field with polytetrafluoroethylene as an individual modification feature.

17. The method of claim 11, wherein comprising machining a relief in either a coil or a rotor slot of the generator field as an individual modification feature.

* * * * *